United States Patent [19]

Huff et al.

[11] 4,425,102

[45] Jan. 10, 1984

[54] VARIABLE SPEED BELT DRIVE

[75] Inventors: Robert O. Huff; Edward F. Krome, Jr., both of Columbus, Ind.

[73] Assignee: Reliance Electric Company, Columbus, Ind.

[21] Appl. No.: 191,316

[22] Filed: Sep. 26, 1980

[51] Int. Cl.³ ............................................. F16H 55/56
[52] U.S. Cl. ........................................ 474/28; 474/19
[58] Field of Search ................... 474/16, 17, 18, 19, 474/28, 37, 46

[56]            References Cited
        U.S. PATENT DOCUMENTS

| 3,888,093 | 6/1975 | Downey | 64/13 |
| 4,027,358 | 6/1977 | Llach et al. | 474/28 |
| 4,216,678 | 8/1980 | Butterfield et al. | 474/46 |

FOREIGN PATENT DOCUMENTS

| 1140570 | 7/1957 | France . | |
| 1340277 | 9/1963 | France . | |
| 2040932 | 1/1971 | France . | |
| 12201 | of 1911 | United Kingdom | 574/28 |
| 772340 | 8/1955 | United Kingdom . | |
| 804708 | 11/1956 | United Kingdom . | |
| 882720 | 2/1958 | United Kingdom . | |
| 907945 | 1/1960 | United Kingdom . | |
| 2004604A | 9/1978 | United Kingdom . | |

*Primary Examiner*—Kenneth Dorner
*Attorney, Agent, or Firm*—Marmaduke A. Hobbs

[57]                ABSTRACT

A variable speed belt drive having a sheave with an axially moveable flange connected to the drive shaft by a flexible element which performs the function of transmitting the torque from the shaft to the axially moveable flange, and which defines a fluid pressure chamber for applying a variable pressure to the moveable flange for moving the flange axially on the shaft as the pressure in the chamber is varied by the operation of a control device. The fixed flange of the same sheave is mounted on a hub and bushing of a flexible coupling connecting the sheave to a drive motor. A belt connects the first sheave to a second variable pitch sheave which is responsive to the load on the drive for maintaining the pitch of the sheave in any preselected position.

25 Claims, 4 Drawing Figures

VARIABLE SPEED BELT DRIVE

BACKGROUND OF THE INVENTION

A common type and widely used variable speed belt drive consists of a pair of sheaves and a belt interconnecting the sheaves in which one of the flanges on at least one of the sheaves is mounted on an axially moveable hub and is adjustable toward and away from the other flange. The hub is mounted on a shaft, and a keying device, such as a key and key ways, interconnects the flange, hub and shaft and prevents relative rotation therebetween. The adjustable sheave is varied by an operator or in response to a control signal and the other sheave automatically adjusts itself to accommodate the adjustment made in the first sheave. In a modification of this basic type, one of the sheaves is variable and the other is moved relative to the adjustable sheave to compensate for variations in the effective belt length when the adjustment in the speed is made. These variable speed drives often operate for extended periods of time under heavy loads, and are constantly subjected to excessive wear, particularly in the axially slidable sheave parts involved in the adjustment for different speeds. As a result of these prolonged adverse operating conditions, notching of the keying device and a substantial amount of fretting and wear occur in the parts subjected to the sliding contact, ultimately interfering with the proper operation and adjustment of the sheaves and necessitating the eventual replacement of the affected parts or of the complete sheave. The sliding parts of the sheave normally most affected by the fretting and wear under the aforementioned conditions consist of the shaft of the drive sheave and the hub slidable thereon, the hub usually being keyed to the shaft for rotation therewith and, when in proper operating condition, being freely moveable axially on the shaft. However, adverse operating conditions may cause roughness and binding between the key in the shaft and the contacting sliding portion of the hub, so that the sliding movement between the two parts is restrained to the extent that optimum operation of the variable pitch sheave is not possible even under normal operating conditions.

Various types of mechanisms and systems have been used for adjusting the moveable flange of the variable pitch sheave or sheaves. These include mechanical types, manually operated or power driven, or hydraulic types. In both the mechanical and hydraulic types of prior adjustment mechanisms, the moveable flange is keyed to the shaft and is adapted to move axially on the shaft in response to changes in the setting on the adjustment mechanism therefor. These adjustment mechanisms and systems function satisfactorily under normal operating conditions while the drives are in good condition, but they often become unreliable or inoperable from fretting and scoring of the shaft and keys. In order to overcome this difficulty, plastic bushings disposed between the shaft and the hub of the moveable flange, and in some instances along the keys, have been used; however, the basic reason for the adverse condition developing along the keys is not eliminated by these bushings, although the problem may be somewhat alleviated. Further, the hydraulic system for adjusting the moveable flange is often relatively complicated and difficult to maintain in optimum operating condition.

In conventional variable speed belt drives having a fixed flange in the sheave, the flange is secured to a shaft which is connected directly to and supported by the drive motor shaft, or which is journaled in a pillow block at each end and which extends from one of the pillow blocks for connection to the motor shaft. The sheave and motor shafts may be connected by a flexible coupling having flanges with hubs for mounting on the two shafts in spaced end-to-end relation. This type of shaft connection requires a substantial amount of space in order to assemble the two shafts and the coupling beyond the respective pillow block, thus making the overall size of the drive relatively large and at times too large for particular installations, wherein compactness is essential to fit in limited areas, such as that available in air conditioner housings and the like. The direct coupled type of drive described above has the disadvantage of being extremely difficult to align. The motor-mounted constant-speed shaft and the separately mounted variable speed shaft must be made parallel and square (belt between the sheaves) in three planes to a very small tolerance, after the pieces are installed in the machine to be driven. Since sophisticated alignment devices, expertise and the time required to make the proper alignment, are seldom available at an installation site, all independent-shaft belt connected mechanical variable speed drives basically have a short belt and sheave life caused by misalignment.

SUMMARY OF THE INVENTION

The present invention involves the use of a fluid operated device, preferably consisting of a flexible torsion device of annular shape disposed around the constant speed shaft of the variable speed belt drive adjacent the moveable flange thereof, for performing the dual function of controlling the axial position of the moveable flange and, at the same time, of coupling the same flange to the shaft on which it is mounted. A system which is responsive to some predetermined operating condition or a preset speed, controls the operation of the fluid operated device to move the flange to the position required to obtain the desired performance of the drive. The fluid operated device is so constructed and designed that, when coupled to the shaft and moveable flange, the torque is transmitted between the shaft and flange without a key or other element directly connecting the two components. However, the device is capable of use merely as the coupling element between the shaft and flange or merely as a fluid controlled element for adjusting the moveable flange axially on the shaft. These features may be used with a special mounting for the fixed flange of the drive sheave, which also forms a part of the coupling for connecting the drive motor to the sheave. They may also be used with an automatically operated mechanism which applies additional force to the moveable flange of the driven sheave when the drive is under relatively heavy load, and which automatically relieves the additional force when the load on the drive returns to normal.

One of the primary objects of the present invention is to provide a variable speed drive having adjustable pitch sheaves with an axially moveable hub, which can effectively and readily be adjusted to obtain a desired operating speed under adverse operating conditions, and which is so constructed and arranged that the sliding hub will continue to operate under the adverse conditions without the sliding surfaces becoming scored, corroded or otherwise damaged or subjected to excessive wear.

A further object of the invention is to provide an adjustment for the moveable flange of one of the sheaves of a variable speed belt drive, which includes a pneumatic device for controlling the position of the moveable flange and which performs the additional function of interconnecting the shaft and moveable flange in operating relationship.

Another object of the invention is to provide a variable speed drive which will operate over extended periods of time without fretting occurring on the relatively slidable surfaces of the shaft and sliding hub involved in the adjustment of the pitch of the sheave, and which will maintain optimum operating performance over extended periods in adverse operating conditions.

Still another object of the invention is to provide in a variable speed drive, the combination of a shaft and an axially moveable hub mounted thereon in which wear, fretting and the like between those parts in sliding contact are prevented or minimized, even under adverse operating conditions, thereby maintaining the sheave in optimum operating condition regardless of the loads encountered throughout the normal operating range of the drive.

Another object is to provide a variable speed drive of the aforementioned type which is compact and can be easily fabricated, assembled and installed, and which can thereafter be readily serviced and repaired in the field, using easily installed and assembled parts and subassemblies and which does not require belt and shaft alignment during on-site installation.

Still a further object of the invention is to provide a variable speed drive which is so constructed and designed that it will provide optimum performance under long continued operation and under adverse conditions, such as heavy loads and frequent changes in the load and in variations in output speed.

Objects and advantages of the present variable speed drive, in addition to those recited hereinbefore, will become apparent from the following description and accompanying drawings.

DESCRIPTION OF THE PREFERRED EMBODIMENT

Figure 1:
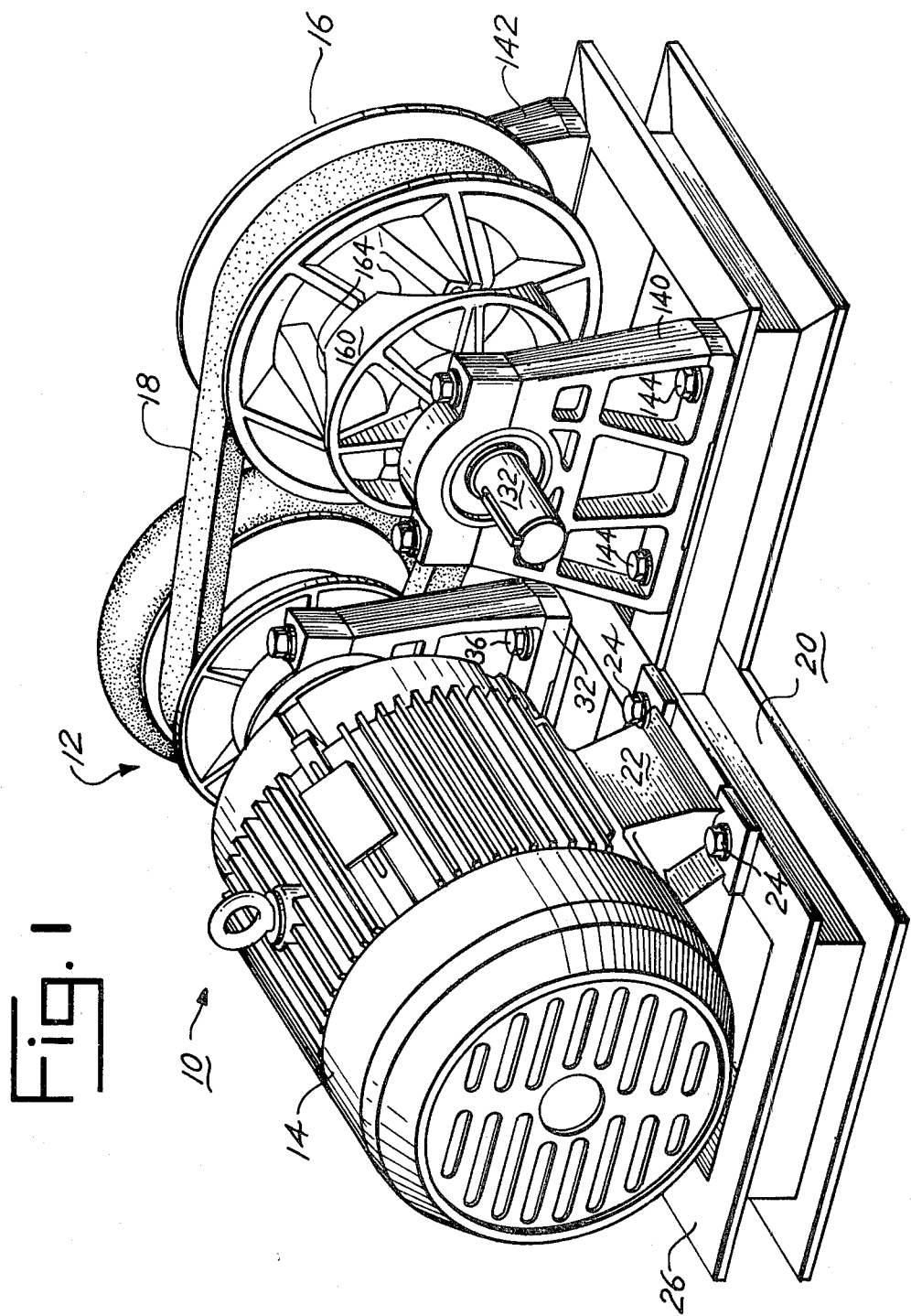
FIG. 1 is a perspective view of the variable speed belt drive embodying the present invention, showing the motor, two variable sheaves and a belt interconnecting the sheaves.
Figure 2:
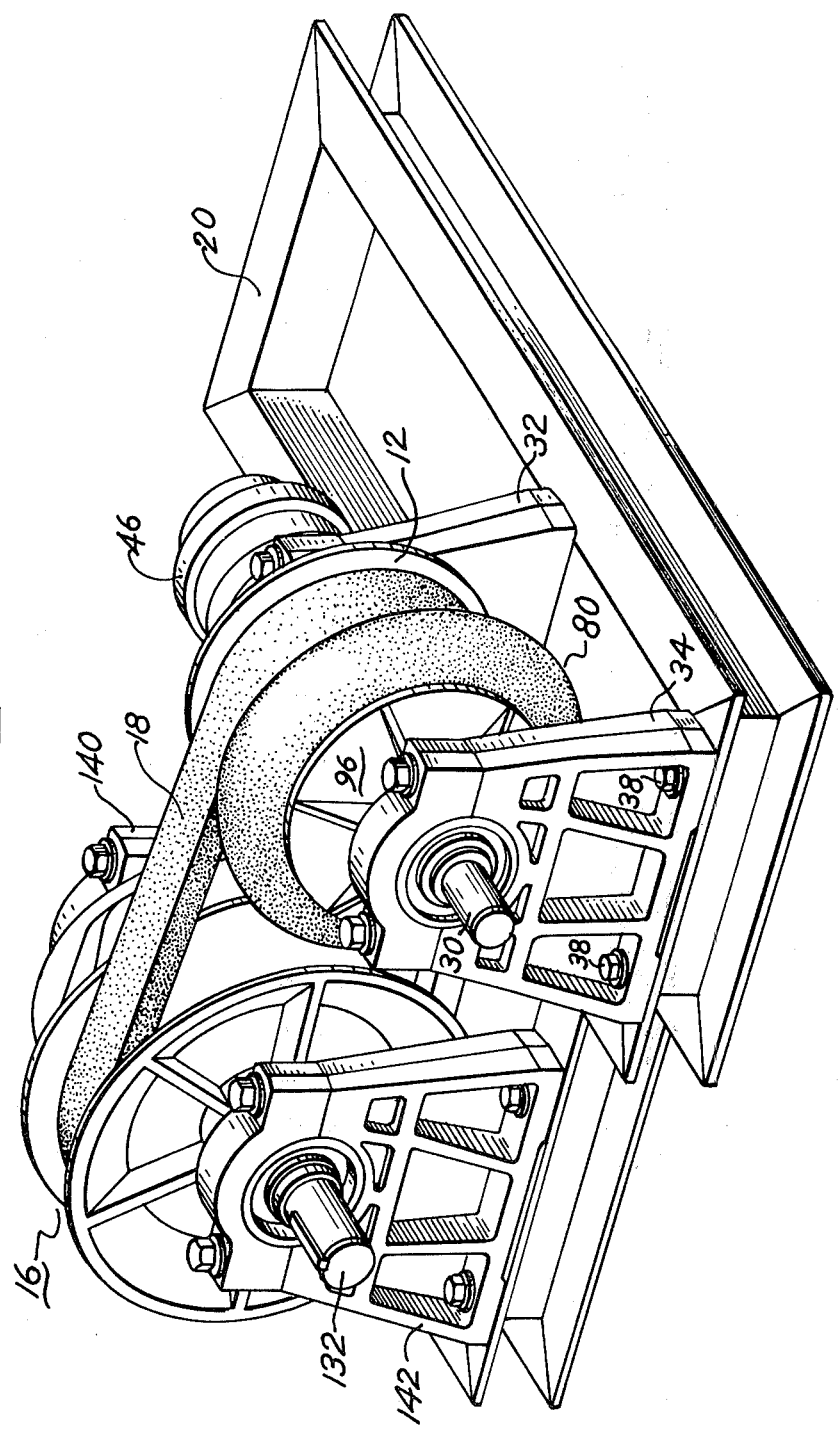
FIG. 2 is a perspective view of the present variable speed belt drive as seen from the side opposite the side shown in FIG. 1, with the motor for driving the sheaves omitted.

Referring more specifically to the drawings, and to FIG. 1 in particular, numeral 10 indicates generally the present variable speed belt drive having a constant speed drive sheave assembly 12, an electric motor 14 for driving the sheave assembly 12, a variable speed sheave assembly 16 adapted to be connected to the equipment to be driven by the variable speed drive, and a wide V-belt 18 trained on the sheaves of the two assemblies for transmitting the power from the sheave assembly 12 to sheave assembly 16. The motor and two sheave assemblies are mounted on a base 20 which forms a unitary structure of the three principal components. The motor may be considered conventional for the purpose of the present invention and has a base 22 secured to the drive base 20 by a plurality of bolts 24 extending downwardly through the motor base and through a flange 26 on the upper side of drive base 20. Since the motor is conventional and various makes and models can be used in the drive, further description of the motor will not be given herein.

Figure 3:
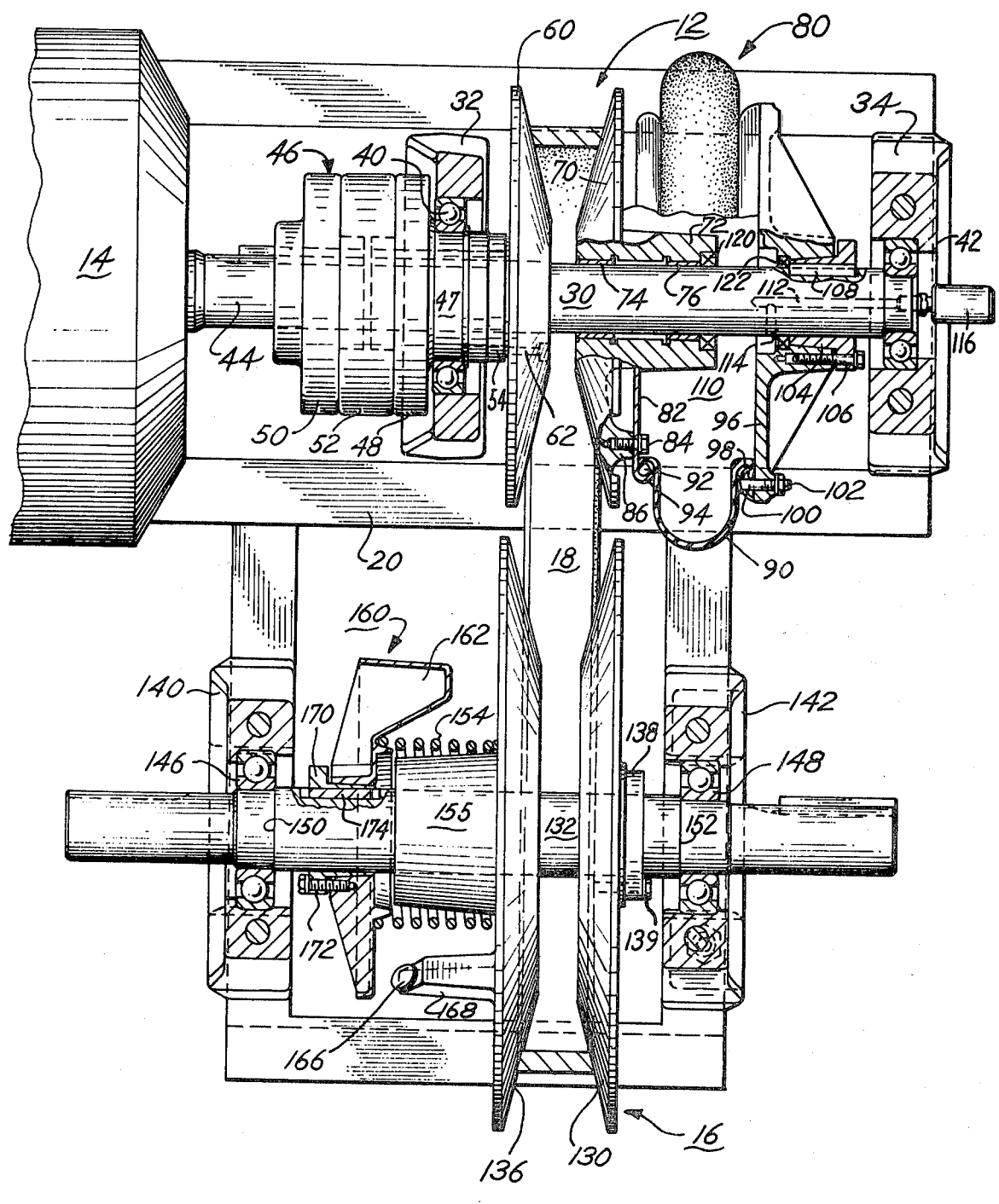
FIG. 3 is a top plan and partial cross sectional view of the variable speed belt drive shown in FIGS. 1 and 2, showing the sheaves in one torque output relationship.
Figure 4:
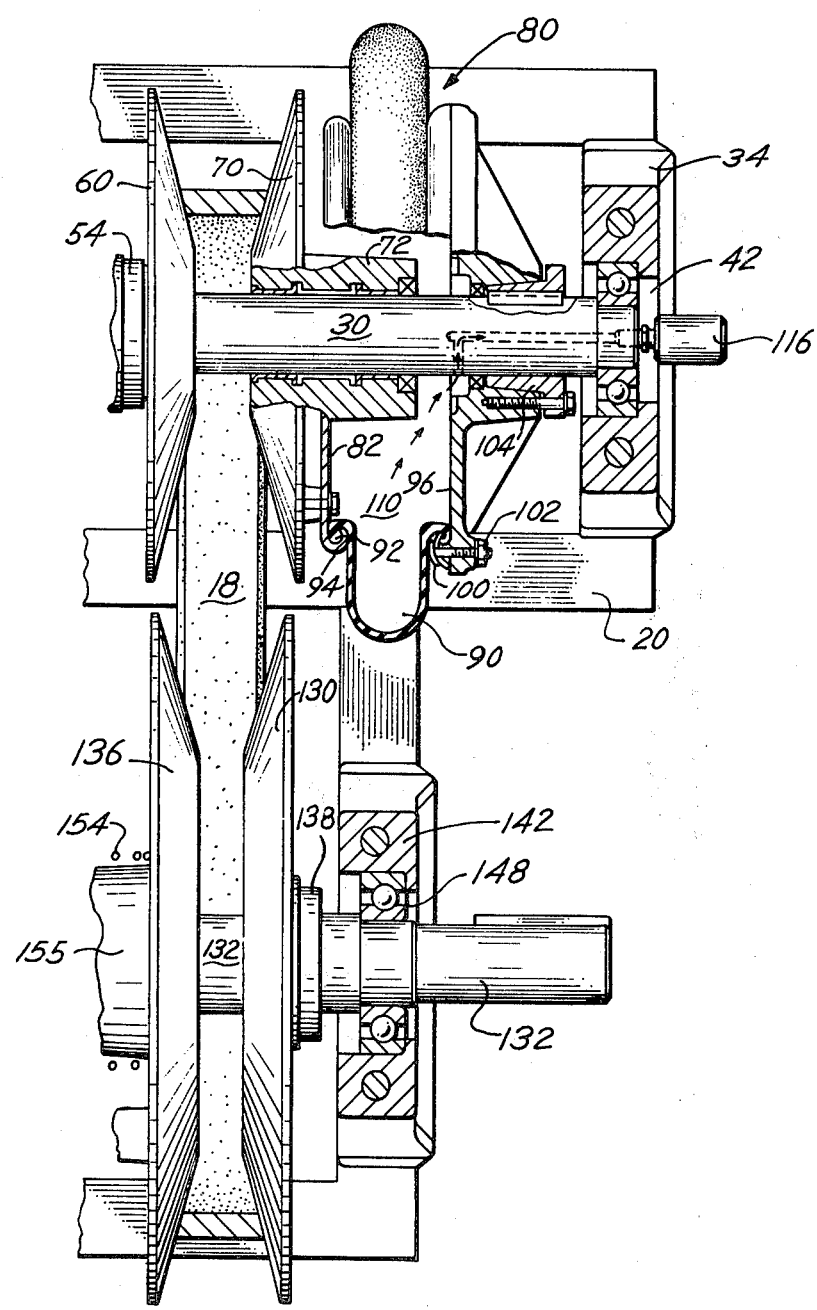
FIG. 4 is a top plan and cross sectional view similar to that shown in FIG. 3, but showing the sheaves in a different torque output relationship.

The construction of the sheave assembly 12 is best seen in FIGS. 3 and 4, and consists of a shaft 30 journaled in pillow blocks 32 and 34 secured by bolts 36 and bolts 38 of the two pillow blocks, respectively, extending downwardly through the lower part of the respective pillow blocks and through upper flange 26 of base 20, thereby securing the two pillow blocks firmly to the base. The pillow block 32 contains a ball bearing 40, and pillow block 34 contains ball bearing 42. Shaft 30 is connected to shaft 44 of electric motor 14 by a coupling 46 having a flange 48 connected to the left hand end of shafft 30, as viewed in FIG. 3, a flange 50 connected to the motor shaft, and a flexible element 52 interconnecting the two coupling flanges for transmitting the torque from the motor to the shaft and for compensating for any minor misalignments which may be present between shafts 30 and 44. The hub 47 of flange 48 of the coupling is journaled in bearing 40, and a bushing 54, which has a straight bore around shaft 30 and a tapered outside, is pressed into a mating taper of the bore of fixed flange 60.

Fixed flange 60 has three drilled-through holes in which three bolts 62 are disposed and the three holes in flange 60 are aligned with three through holes in the flange of bushing 54. The hub 47 of coupling flange 48 has three drilled and tapped holes in the end face opposite coupling element 52. The through holes in flange 60 and bushing 54 are aligned with the tapped holes in flange 48, and bolts 62 are inserted from the working face side of flange 60, through holes in the flange of bushing 54 and threaded into hub 47. Hub 47 is pressed onto and keyed to the end of shaft 30, and bushing 54, being split at one place length-wise, slips over shaft 30. Bushing 54 is not keyed to the shaft. This arrangement facilitates alignment of matching through-holes in bushing 54 and flange 60 with tapped holes in flange 48. When the bolts are tightened into coupling hub 47, a solid coupling is formed between the three pieces and the shaft 30. Tightening the bolts engages the mating tapers of flange 60 and bushing 54, as well as compressing bushing 54 firmly onto shaft 30. Hence, bushing 54 serves as a hub for flange 60, with frictional holding forces being present between the faces of the flange of bushing 54 and hub 47 of the coupling flange 48. An advantage of this arrangement is obtained as a result of the path of the power transmitted into the drive from motor 14. Since flange 60 is clamped and bolted through bushing 54 to hub 47, power is transmitted directly from coupling 46 to the flange 60, without relying on shaft 30 and the shaft-flange hub interface to transmit input torque to flange 60. This power is transferred to the flange 60 at a diameter larger than the diameter of shaft 30 itself, by the coupling bolt circle and frictional interface, thus reducing the forces on the mating components over shaft-only power transmission. Power is transmitted from coupling flange 48 to the sliding flange 70 through shaft 30 which is keyed to hub 47 of the coupling flange, and which is journaled in bearing 42. The effect of this input coupling-flange arrangement is low individual part loading through a split power path. Total input horsepower is transmitted from motor 14 through coupling components 46, 52 and 48, and the portion of that power for flange 60 goes directly from flange 48 to flange 60, with only the portion for flange 70 having to be interfaced into shaft 30 through a key between hub 47 and the shaft. The variable flange 70 of the sheave assembly 12 is connected to hub 72 which is mounted on shaft 30 and is preferably provided with low friction bushings 74 and 76 so that the sheave will move with little resistance from friction along shaft 30 as the pitch and axial position of the sheave are varied in accordance with output speed requirements.

The sheave flange 70 and hub 72 are moved axially along shaft 30 by a fluid operated device 80 connected on one side to flange 70 by a plate 82 and a plurality of screws 84 extending through the plate into bosses 86 on the outside surface of moveable flange 70. A flexible element 90 of elastomeric material is connected on the inner side to plate 82 by an annular bead 92 disposed in an annular groove 94 on the plate. The opposite side of flexible element 90 is connected to a plate 96 by an annular bead 98 clamped to the periphery of plate 96 by an annular clamping ring 100 secured to the periphery of the plate by a plurality of screws 102 spaced around the periphery of plate 96. Plate 96 is rigidly secured to shaft 30 by tapered bushing 104 seated in a tapered hub of the plate and secured therein by a plurality of screws 106 extending through the flange on the bushing into the hub of the plate 96, thereby being secured to the shaft for rotation therewith, and is preferably keyed to the shaft by a key 108. Element 90, plate 82 and plate 96 form an assembly which is essentially fluid tight and which defines a fluid chamber 110 connected to a source of fluid, preferably air under pressure, by passages 112 and 114 in shaft 30, passage 112 being connected to a rotatable coupling 116 mounted on the end of the shaft and through a conduit (not shown) to the source of controlled air pressure.

The position of flange 70 is varied relative with respect to flange 60 to change the pitch of the sheave, by varying the pressure in chamber 110 through the control system which regulates the flow of air into and from the chamber through passages 112 and 114. While fluids other than air may be used, the preferred embodiment utilizes air pressure for controlling the pressure in chamber 110 to vary the position of sheave flange 70.

In addition to functioning as the actuator for positioning flange 70 along shaft 30, element 90 also serves as the torque transmitting element between shaft 30 and flange 70. The components for transmitting this torque consist of plate 96 secured rigidly to shaft 30, element 90, and plate 82 rigidly connected to flange 70. The flange is not connected to the shaft by a key or spline but, except for the element 90, is free to rotate on shaft 30. Any appreciable rotation between the shaft 30 and flange 70 is prevented by the coupling effect of element 90 between the shaft and the flange. The element is preferably constructed of rubber or rubber-like material with interspersed layers of fabric so that the two side walls of the element will expand and contract freely laterally, without the diameter of the element increasing or decreasing appreciably, as the pressure in chamber 110 is varied in the operation of varying the position of flange 70 on shaft 30. The chamber 110 is sealed along shaft 30 by seal 120 disposed in the end of hub 72 and seal 122 disposed in the adjacent end of the hub of plate 96. Since the beads 92 and 98 on opposite sides of element 90 form a seal with the peripheral portions with plates 82 and 96, chamber 110 is completely closed with the exception of passages 112 and 114.

The sheave assembly 16 consists of a fixed flange 130 mounted on shaft 132 and secured thereto, and a moveable flange 136 mounted on the shaft for axial and rotational movement thereon. Flange 130 is secured to the shaft by a tapered bushing 138 and three bolts 139 extending through the bushing into the hub of flange 130. The shaft 132 is supported by pillow blocks 140 and 142 bolted by a plurality of bolts 144 to upper flange 26 of base 20, the shaft being journaled in bearings 146 and 148 of pillow blocks 140 and 142, respectively. The shaft, which has shoulders 150 and 152 adjacent bearings 146 and 148 to prevent axial movement of the shaft, extends outwardly beyond the two bearings to permit the shaft to be coupled at either end to the equipment to be driven. Moveable flange 136 is constantly urged toward the other flange by a coil spring 154 disposed around hub 155 and reacting between the external surface of the flange and a cam assembly indicated generally by numeral 160. Spring 154 is of low rate and provides non-linear force against flange 136. Its main function is preloading the flange during start-up and slowdown, the torque sensing cam providing almost all axial force on flange 136. Thus, when flange 70 of the sheave assembly 12 is changed by moving flange 70 toward flange 60 to increase the speed of the drive, the pressure applied by the belt as a result of the movement of flange 70, causes flange 136 to move away from flange 130, and when flange 70 is moved away from flange 60, the relief of pressure by the belt on flanges 130 and 136 permits the spring and cam to move the flange 136 axially toward flange 130.

In order to assist in maintaining the proper position of flange 136 relative to flange 130 for any given load and/or in obtaining selected speeds of sheave assembly 12, and thereby obtaining the desired torque output without slippage of the belt, a cam assembly 160 is utilized which includes a cam element 162 having a plurality of bi-directional cam surfaces 164 thereon for engaging a plurality of respective cam followers 166 mounted on lugs 168 on the external surface of moveable flange 136. As the load increases, additional force is applied to the belt and flange 136, which in turn causes the cam followers to move up the respective cam surfaces 164 to prevent flange 136 from moving excessively away from flange 130 under the influence of heavy loading of the drive. If desired, this movement may cause a corresponding movement of flange 70 away from flange 60. This is possible in view of the resilient effect provided by flexible element 90 and the air in chamber 110, the air in the chamber being compressed either by the belt force and the movement of flange 70 or by a pressure control device in the air pressure control system (not shown). The cam 160 is rigidly secured to shaft 132 by a bushing 170 and a plurality of screws 172 extending through a flange on the bushing into the cam. A key 174 may be provided between bushing 170 and the shaft so that the cam is firmly secured to the shaft against both axial and angular movement relative thereto.

In the operation of the present variable speed V-belt drive as described herein in detail, the motor 14 drives shaft 30 through coupling 46, which in turn drives sheave flanges 60 and 70 and belt 18. Belt 18 transmits the torque from sheave assembly 12 to sheave assembly 16, which in turn drives shaft 132 and the equipment or machinery connected thereto. The desired speed and torque output of the drive are controlled by the pressure in chamber 110, which positions flange 70 axially on shaft 30 with respect to flange 60, thereby varying the pitch of the sheave. As flange 70 is moved toward flange 60, the belt moves outwardly toward the periphery of the two flanges, thus causing the belt to apply a greater force on flanges 130 and 136 and causing the moveable flange 136 to move to the left as viewed in FIGS. 3 and 4 against spring 154, thus increasing the output speed of the drive. An adjustment can be made at any time during the operation of the drive by varying the pressure of the air transmitted through passages 112 and 114 to chamber 110 from the pressure control system (not shown).

In the event the drive is placed under load, the drive automatically compensates for the additional load by the operation of the cam assembly 160 wherein the cam follower 166 travels relative to the cam 164, holding moveable flange 136 in the proper position to maintain the desired output speed regardless of the increased load on the drive. This retains the belt tight and produces the required pressure of the belt on the flanges of sheave assembly 16 for optimum power output. There are a number of advantages obtained by the present invention. For example, assembly 80 avoids the use of keys and splines for operationally connecting shaft 30 to flange 70. This minimizes fretting and binding, which often occur in this type of drive when keys or splines are used to prevent relative rotation between a flange such as flange 70 and the shaft on which it is mounted. The plastic bushings 74 and 76 also facilitate free movement of flange 70 and hub 72 on the shaft, and hence prolong the optimum operation of the drive. Other advantages include the compactness and reliability of the coupling and flange construction connecting the sheave to the motor, and the superior performance of the drive resulting from a combination of the foregoing features with the cam controlled driven sheave.

While only one embodiment of the present variable speed V-belt drive has been described in detail herein, various changes and modifications may be made without departing from the scope of the invention.

We claim:

1. A variable speed belt drive comprising a drive sheave having a shaft, an axially moveable flange mounted on said shaft, and a fixed flange, a driven sheave having a shaft, an axially moveable flange mounted on said last mentioned shaft, and a fixed flange, a belt trained on said sheaves, a coupling means having a circumferentially continuous, flexible element concentric with the shaft of said drive sheave connecting said shaft of said drive sheave and the moveable flange of the drive sheave in driving relationship, said coupling means with the flexible element forming a fluid chamber for adjusting the position of the moveable flange of the drive sheave, and said drive shaft having a passage for connecting the chamber to a source of control fluid pressure, a motor having a shaft for driving said drive sheave, a coupling connecting said motor shaft to the shaft of said drive sheave and having a hub to which the fixed flange on said drive sheave is rigidly connected, and a cam means reacting between the moveable flange of said driven sheave and the shaft of said driven sheave for controlling the pitch diameter of said driven sheave in response to variations in the pitch diameter of said drive sheave.

2. A variable speed belt drive as defined in claim 1 in which said flexible element has two inwardly extending side walls, a means connecting one of said side walls to said moveable flange of the drive sheave, and a means connects the other of said side walls to the shaft of said drive sheave for transmitting torque between the drive shaft and said moveable flange.

3. A variable speed belt drive as defined in claim 1 in which said flexible element has two inwardly extending side walls, a means connecting one of said side walls to said moveable flange of the drive sheave, and a means connects the other of said side walls to the shaft of said drive sheave for transmitting torque between the shaft and said moveable flange.

4. A variable speed belt drive as defined in claim 5 in which the cam means for controlling the pitch of said driven sheave includes a cam for retaining said moveable flange of the driven sheave in a preselected position relative to the fixed flange of said driven sheave when the driven sheave is placed under load.

5. A variable speed belt drive as defined in claim 4 in which said cam means reacting between the moveable flange of the driven sheave and an abutment on the shaft of the respective sheave includes a coil spring disposed around said respective shaft.

6. A variable speed belt drive as defined in claim 5 in which said coupling has a flange attached to said hub, and a flange for mounting on the shaft of a drive motor, and a yieldable element is disposed between and connected to said coupling flanges for transmitting torque between the motor and the shaft of the drive sheave.

7. A variable speed belt drive as defined in claim 1 in which the cam means for controlling the pitch of said driven sheave includes a cam for retaining said moveable flange of the driven sheave in a preselected position relative to the fixed flange of said driven sheave when the driven sheave is placed under load.

8. A variable speed belt drive as defined in claim 7 in which said coupling has a flange attached to said hub, and a flange for mounting on the shaft of a drive motor, and a yieldable element is disposed between said connected to said coupling flanges for transmitting torque between the motor and the shaft of the drive sheave.

9. A variable speed belt drive as defined in claim 1 in which said coupling has a flange attached to said hub and a flange for mounting on the shaft of a drive motor, and a yieldable element is disposed between and connected to said coupling flanges for transmitting torque between the motor and the shaft of the drive sheave.

10. A variable speed belt drive as defined in claim 1 in which a resilient means reacts between the moveable flange of the driven sheave and an abutment on the shaft of the driven sheave is a coil spring disposed around said respective shaft.

11. A variable speed belt drive comprising a drive sheave having a shaft, a fixed flange, and an axially moveable flange mounted on said shaft, a driven sheave having a shaft, a fixed flange, and an axially moveable flange mounted on said shaft of said driven sheave, a belt trained on said sheaves, a coupling means having a circumferentially continuous, flexible element for transmitting torque between the shaft and the moveable flange of the drive sheave and defining a chamber for a control pressure for positioning said moveable flange axially on said drive shaft, said drive shaft having a passage for connecting said chamber with the control pressure, and a resilient means reacting between the moveable flange of said driven sheave and an abutment on the shaft of the driven sheave for controlling the pitch diameter of said driven sheave in response to variations in the pitch diameter of said drive sheave.

12. A variable speed belt drive as defined in claim 11 in which bearings are disposed at each end of the shaft of the drive sheave, and a coupling is provided for connecting one end of the shaft of said drive sheave to a motor and has a hub journaled in the bearing at said one end of the shaft.

13. A variable speed belt drive as defined in claim 12 in which said fixed flange of the drive sheave is connected rigidly to the hub of said coupling.

14. A variable speed belt drive as defined in claim 13 in which a flange for the coupling is connected rigidly to the hub of the coupling.

15. A variable speed belt drive as defined in claim 14 in which the abutment for controlling the pitch of said driven sheave includes a cam for retaining said moveable flange of the driven sheave in a preselected position relative to the fixed flange of said driven sheave when the driven sheave is placed under load.

16. A variable speed belt drive as defined in claim 11 in which the abutment for controlling the pitch of said driven sheave includes a torque sensing cam for retaining said moveable flange of the driven sheave in a preselected position relative to the fixed flange of said driven sheave when the driven sheave is placed under load.

17. A variable speed belt drive as defined in claim 16 in which said resilient means reacting between the moveable flange of the driven sheave and an abutment on the shaft of the respective sheave is a coil spring disposed around said driven shaft.

18. A variable speed belt drive as defined in claim 16 in which said cam is bi-directional.

19. A variable speed belt drive as defined in claim 11 in which said resilient means reacting between the moveable flange of the driven sheave and an abutment on the shaft of the driven sheave is a non-linear spring disposed around said driven shaft.

20. A variable speed belt drive comprising a drive sheave having a shaft, a fixed flange, and an axially moveable flange mounted on said shaft, a driven sheave having a shaft, a fixed flange, and an axially moveable flange mounted on said shaft of said driven sheave, a belt trained on said sheaves, a coupling means having a circumferentially continuous, flexible element for transmitting torque between the shaft and the moveable flange of the drive sheave and defining a chamber for a control pressure for positioning said moveable flange of said drive sheave axially on said drive shaft, said drive shaft having a passage for connecting said chamber with the control pressure, and a cam means reacting between the moveable flange of said driven sheave and the shaft of the driven sheave for controlling the pitch diameter of said driven sheave in response to variations in the pitch diameter of said drive sheave.

21. A variable speed belt drive as defined in claim 20 in which bearings are disposed at each end of the shaft of the drive sheave, and a coupling unit is provided for connecting one end of the drive shaft to a motor and has a hub journaled in the bearing at said one end of the shaft.

22. A variable speed belt drive as defined in claim 21 in which said fixed flange of the drive sheave is connected to the hub of said coupling unit.

23. A variable speed belt drive as defined in claim 20 in which a resilient means reacts between the moveable flange of the driven sheave and said cam means and consists of a coil spring disposed around the shaft of the driven sheave.

24. A variable speed belt drive as defined in claim 20 in which a resilient means reacts between the moveable flange of the driven sheave and said cam means and consists of a spring disposed around the driven shaft.

25. A variable speed belt drive as defined in claim 20 in which caid cam is bi-directional.

* * * * *